Aug. 29, 1939.   M. KLAVIK   2,171,092
STREAMLINE BODY FOR MOTOR VEHICLES WITH AIR-COOLED REAR ENGINES
Filed Aug. 6, 1938

Inventor
Milos Klavik
By B Linger, atty.

Patented Aug. 29, 1939

2,171,092

UNITED STATES PATENT OFFICE

2,171,092

STREAMLINE BODY FOR MOTOR VEHICLES WITH AIR-COOLED REAR ENGINES

Miloš Klavik, Koprivnice, Czechoslovakia

Application August 6, 1938, Serial No. 223,547
In Czechoslovakia August 16, 1937

1 Claim. (Cl. 180—54)

This invention relates to those bodies for motor vehicles with air-cooled rear engines, which are provided with a partition behind the seats of a height which is approximately the same as the height of the front windscreen, said partition being provided with openings for the supply of air to the engine chamber which is closed off at the rear by the partition.

According to the present invention, for this kind of body, a collapsible (folding) hood or roof is arranged so that in its extended condition the air-supply openings can be shut out over the end of the hood behind the seats, a small auxiliary hood terminating over the openings and merging into the rear cover but forming a passage through which the necessary air is supplied to said openings.

A constructional example of the subject of the aplication is shown diagrammatically in the accompanying drawing.

Figure 1:
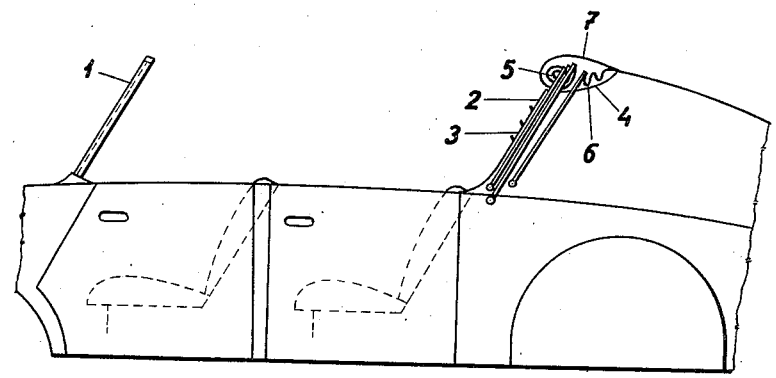
Figure 2:
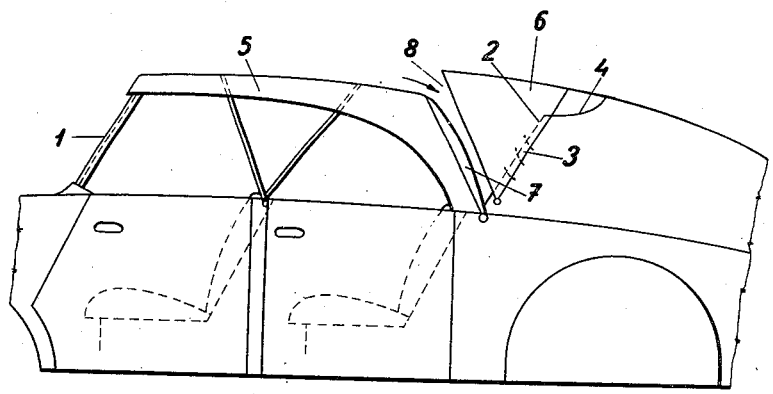

Figure 1 shows the hood folded and
Figure 2 shows the hood extended.

As will be seen from the drawing, the space for the occupants is confined forwardly by a windscreen 1 and rearwardly by a partition 2 with openings 3 for the supply of air to the engine. Said partition 2 is formed at its upper part with a recess 4 in which are stored the folded hood 5 and the auxiliary hood 6. Upon the hood being extended, the end 7 of hood 5 is stretched behind the seats, so that there is formed between said hood 5 and the auxiliary hood 6 a passage 8 through which the air flows to the openings 3. Upon folding the hood, the end 7 of the hood 5 is placed over the hoods so that it will not cover the openings 3.

I claim:

An open streamline body for motor vehicles with air-cooled rear engine, comprising a windscreen, a closed engine chamber, seats, a partition closing said engine chamber from said seats and provided with slot openings for admitting air for cooling, a two-part hood, one part of said hood extending from the windscreen to behind the seats, and the other part forming a continuation of the hood whereby a passage is formed between the two hood parts for ingress of air to the slot openings.

MILOŠ KLAVIK.